US006462639B1

(12) United States Patent
Farag et al.

(10) Patent No.: US 6,462,639 B1
(45) Date of Patent: Oct. 8, 2002

(54) FUSE CUTOUT WITH DOME TOP CONTACT AND KNURLED FUSEHOLDER CAP

(75) Inventors: Samir F. Farag, Columbia; Daren A. Clark, Centralia; Bradley W. Davis, Columbia, all of MO (US)

(73) Assignee: Hubbell Incorporated, Orange, CT (US)

( * ) Notice: Subject to any disclaimer, the term of this patent is extended or adjusted under 35 U.S.C. 154(b) by 133 days.

(21) Appl. No.: 09/617,094

(22) Filed: Jul. 14, 2000

(51) Int. Cl.[7] ...................... H01H 85/042; H01H 85/30; H02M 3/08

(52) U.S. Cl. ....................... 337/172; 337/171; 337/174; 337/175; 337/169; 361/104

(58) Field of Search ................................ 337/292, 159, 337/161–164, 168–175, 186, 228; 361/102, 104, 115

(56) References Cited

U.S. PATENT DOCUMENTS 1,939,371 A 12/1933 Spurgeon
2,074,913 A * 3/1937 Johnson ...................... 337/172
2,088,415 A 7/1937 Heinrich
2,174,476 A 9/1939 Pittman et al.
2,230,955 A 2/1941 Johnson
2,269,372 A 1/1942 Johnson
2,310,466 A 2/1943 Schultz et al.
2,324,888 A 7/1943 Strobel
2,458,742 A 1/1949 Schultz
2,464,565 A 3/1949 Evans et al.
2,584,586 A 2/1952 Hubbard
2,862,080 A 11/1958 Yonkers
2,910,560 A 11/1959 Stroup et al.
3,594,676 A * 7/1971 Misare ....................... 337/180
3,827,010 A 7/1974 Cameron et al.
4,184,138 A * 1/1980 Beard et al. ................ 337/144
4,326,184 A * 4/1982 Murdock .................... 337/168
4,414,527 A * 11/1983 Biller ......................... 337/169
4,540,968 A 9/1985 Kato et al.
4,546,341 A 10/1985 McNaghten et al.
4,768,010 A * 8/1988 Brown et al. ............... 337/169
4,774,488 A 9/1988 Field
4,857,879 A 8/1989 Morgan
5,463,366 A * 10/1995 Hassler et al. .............. 337/159
5,559,488 A * 9/1996 Hassler et al. .............. 337/158
5,760,673 A * 6/1998 Hassler et al. .............. 337/168
5,854,582 A * 12/1998 Clark et al. ................... 335/32
6,211,768 B1 * 4/2001 Cress et al. ................. 337/161

FOREIGN PATENT DOCUMENTS

JP 5-101767 * 4/1993 ................. 337/168

OTHER PUBLICATIONS

Hubbell Power Systems Catalog titled Cutout and Cutout–Arrester Combinations; pp. 10A–1 to 10A–7; Nov. 1996.

* cited by examiner

*Primary Examiner*—Anatoly Vortman
(74) *Attorney, Agent, or Firm*—Mark S. Bicks; Tara L. Hoffman

(57) ABSTRACT

A fuse cutout for connection to a power source includes a mounting having upper and lower support members extending from opposing ends of the mounting. The upper support member includes a first contact having opposing first and second end portions, with the first end portion being attached to the upper support member, and a dome portion disposed between the first and second end portions. The dome portion includes opposing first and second dome surfaces and a first ridge extending along the second dome surface. A holder member is fixedly attached to the lower support member of the mounting. A pivot member is received in the holder member at a first pivot point, the pivot member being movable between first and second positions. A fuseholder is movable between closed and open positions and has upper and lower ends. The lower end is pivotally coupled to the pivot member at a second pivot point. The upper end has an engagement surface for engaging the first ridge of the dome portion of the first contact of the mounting forming an electrical connection therewith.

36 Claims, 6 Drawing Sheets

FUSE CUTOUT WITH DOME TOP CONTACT AND KNURLED FUSEHOLDER CAP

RELATED APPLICATIONS

This application relates to commonly assigned and concurrently filed U.S. patent application Ser. No. 09/617,095 of Richard W. Smith et al., entitled Fuse Cutout With Integrated Link Break Lever And Fuse Link Ejector, the subject matter of which is hereby incorporated by reference.

FIELD OF THE INVENTION

The present invention generally relates to fuse cutouts used with power distribution systems as protective devices against electrical overload. In particular, the fuse cutout includes a mounting assembly, a pivotally movable fuseholder assembly received in the mounting assembly, and a fuse link held within the fuseholder that melts upon occurrence of an overload creating a fault interruption. The mounting assembly includes a top contact with a dome portion that frictionally engages the knurled outer surface of the fuseholder cap of the fuseholder assembly when the fuse cutout is operational. The frictional engagement ensures that the top contact and fuseholder cap remain in engagement prior to either the fuse link melting or the manual breaking of the fuse link by the link break lever.

BACKGROUND

The primary purpose of a fuse cutout is to provide protection for power distribution systems and the various apparatus on those power lines such as transformers and capacitor banks. An over current or electrical overload in the system can occur under various conditions, such as an animal or tree contacting the power lines or more than one power line contacting each other. The fuse cutout acts to interrupt the current, and then the fuseholder of the cutout "drops out", thereby preventing the voltage from being impressed across the fuseholder and providing a visual indication of operation to the utility line crew. Specifically, upon occurrence of an overload, the fuse link disposed within the fuseholder melts allowing the fuseholder to drop and interrupt the current.

Problems have occurred in conventional fuse cutouts when the fuseholder drops just prior to the fuse link melting. When the frictional engagement between the top contact of the mounting assembly and the fuseholder cap is not maintained, premature drop out results in catastrophic failure, flashover and damage to the fuse cutout. In addition, failure to interrupt an over current occurs in the conventional fuse cutouts when the fuseholder does not drop out, particularly after the fuse link has melting. Usually this occurs when the fuseholder cap gets stuck on the top contact preventing the fuseholder from pivoting to a drop out position.

Also, conventional fuse cutouts are susceptible to damage during operation, typically when a lineman forces the fuseholder closed with respect to the mounting assembly, thereby bending and damaging the fuse cutout. Moreover, the conventional fuse cutouts are also expensive to manufacture because the top contacts are formed of a thick copper alloy plate.

Examples of prior art fuse cutouts are disclosed in the following U.S. Pat. No. : 2,088,415 to Heinrich; U.S. Pat. No. 2,230,955 to Johnson; U.S. Pat. No. 2,324,888 to Strobel; U.S. Pat. No. 2,862,080 to Yonkers; U.S. Pat. No. 2,910,560 to Stroup et al.; U.S. Pat. No. 4,546,341 to McNaghten et al.; and U.S. Pat. No. 4,857,879 to Morgan.

SUMMARY OF THE INVENTION

Accordingly, an object of the present invention is to provide a fuse cutout that avoids catastrophic failure by preventing disengagement of the top contact and the fuseholder cap prior to the melting of the fuse link.

Another object of the present invention is to provide a fuse cutout that ensures consistent drop-out of the fuseholder upon the occurrence of an overload and the melting of the fuse link.

A further object of the present invention is to provide a fuse cutout that minimizes damage to the fuse cutout due to the opening and closing of the fuseholder.

A yet further object of the present invention is to provide a fuse cutout with a top contact that Is highly conductive and inexpensive to manufacture.

The foregoing objects are basically attained by a fuse cutout for connection to a power source comprising a mounting having upper and lower support members extending from opposing ends of the mounting, respectively. The upper support member includes a first contact extending therefrom. The first contact has opposing first and second end portions with the first end portion being attached to the upper support member, and a dome portion disposed between the first and second end portions. The dome portion includes opposing first and second dome surfaces and a first ridge extending along the second dome surface. A holder member is fixedly attached to the lower support member of the mounting. A pivot member is received in the holder member at a first pivot point, the pivot member being movable between first and second positions. A fuseholder is movable between closed and open positions and has upper and lower ends, the lower end being pivotally coupled to the pivot member at a second pivot point. The upper end has an engagement surface for engaging the first ridge of the dome portion of the first contact of the mounting forming an electrical connection therewith.

The foregoing objects are also obtained by a fuse cutout for connection to a power source comprising a mounting having upper and lower support members extending from opposing ends of the mounting, respectively. The upper support member includes a first contact extending therefrom. The first contact has opposing first and second contact surfaces, a first end portion attached to the upper support member, a second end portion opposite the first end, and a dome portion disposed between the first and second end portions. A holder member is fixedly attached to the lower support member of the mounting. A pivot member is received in the holder member at a first pivot point, the pivot member being movable between first and second positions. A fuseholder is movable between closed and open positions, and includes upper and lower ends. The lower end is pivotally coupled to the pivot member at a second pivot point. The upper end has a cap with opposing top and bottom portions and a middle portion extending therebetween, the top portion having a substantially knurled outer surface. The first and second positions of the pivot member correspond to the closed and open positions of the fuseholder, respectively. The knurled outer surface of the cap frictional engages the dome portion of the first contact when the fuseholder is in the closed position forming an electrical connection therewith.

By structuring the fuse cutout in this manner, failure of the cutout is avoided. In particular, the structure of the top contact and the fuseholder cap ensures both that the fuseholder does not drop prior to the melting of the fuse link and that it consistently drops after the link melts upon an occurrence of an overload.

Other objects, advantages and salient features of the invention will become apparent from the following detailed description which taken in conjunction with annexed drawings, discloses the preferred embodiment of the present invention.

BRIEF DESCRIPTION OF THE DRAWINGS

Referring to the drawings which form a part of this disclosure.

DETAILED DESCRIPTION OF THE INVENTION

Figure 1:
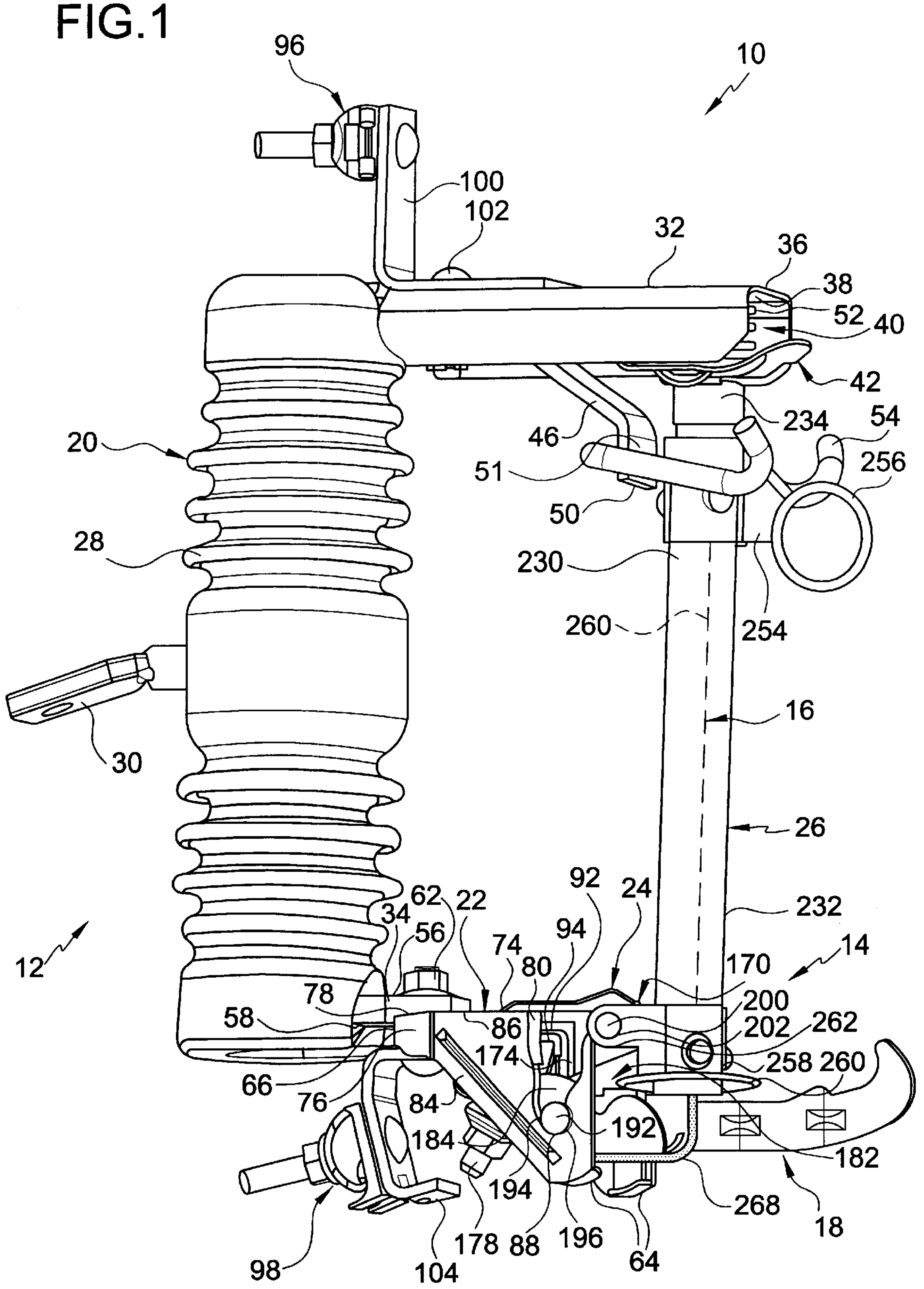
FIG. 1 is front, left side, perspective view of a fuse cutout according to an embodiment of the present invention, illustrating a fuseholder assembly of the cutout in a closed position.
Figure 5:
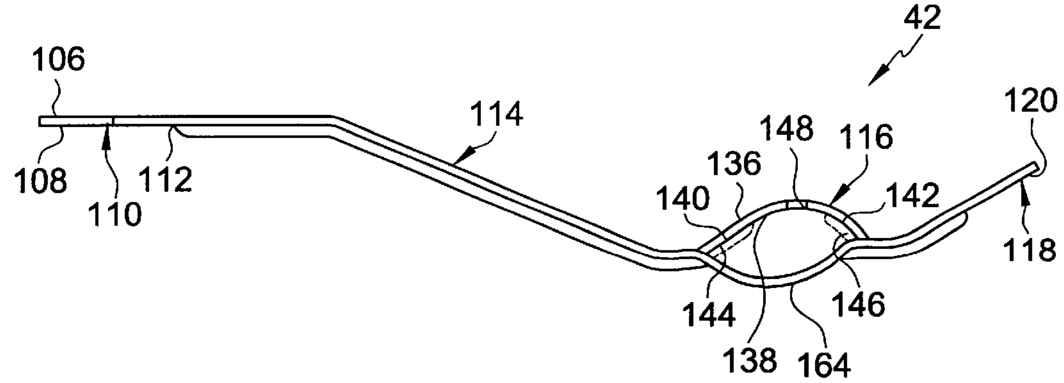
FIG. 5 is a side elevational view of the top contact of the fuse cutout illustrated in FIG. 1.
Figure 6:
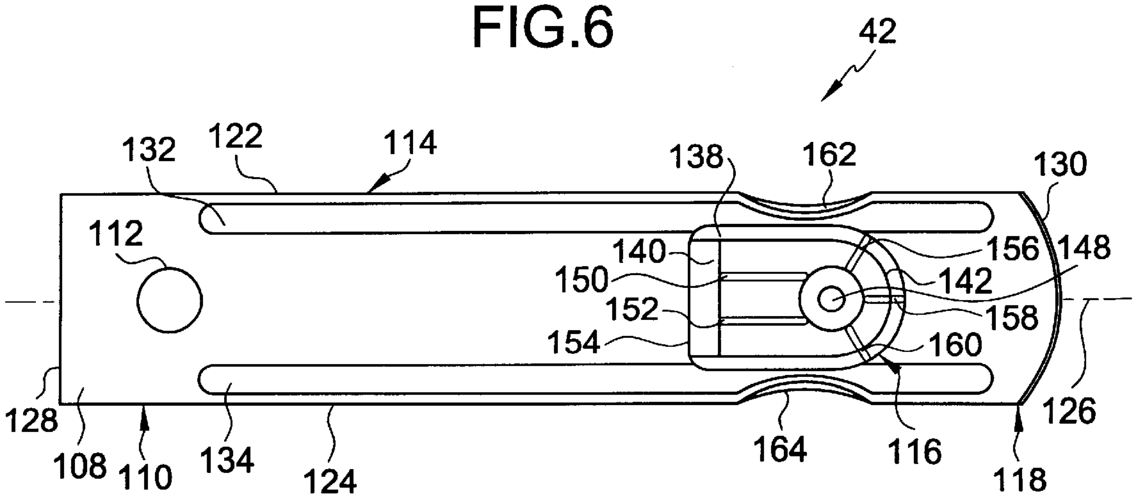
FIG. 6 is a bottom plan view of the top contact of the fuse cutout illustrated in FIG. 1.
Figure 7:
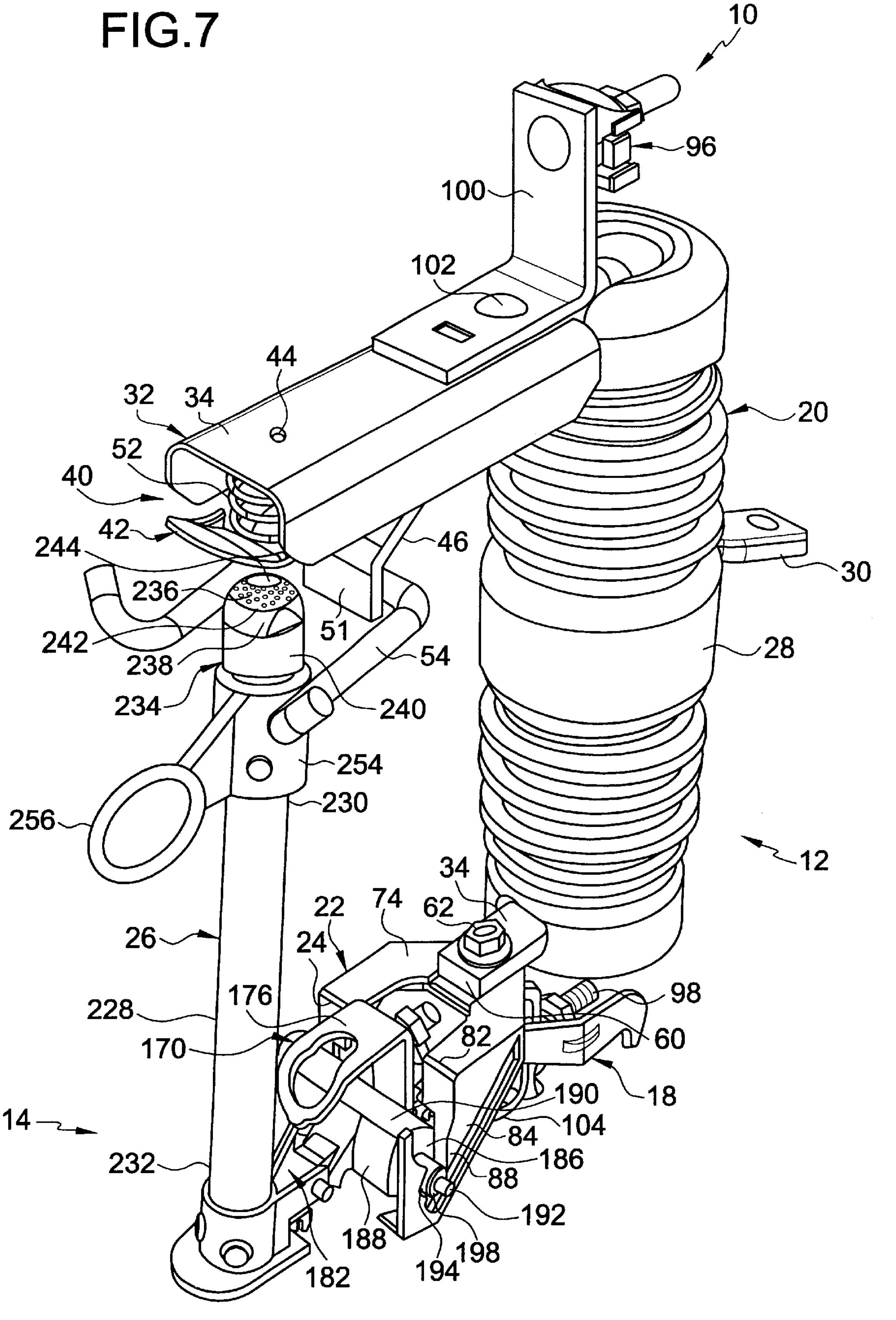
FIG. 7 is a front, right side, perspective view of the fuse cutout illustrated in FIG. 1, showing the fuseholder assembly in an open position.
Figure 8:
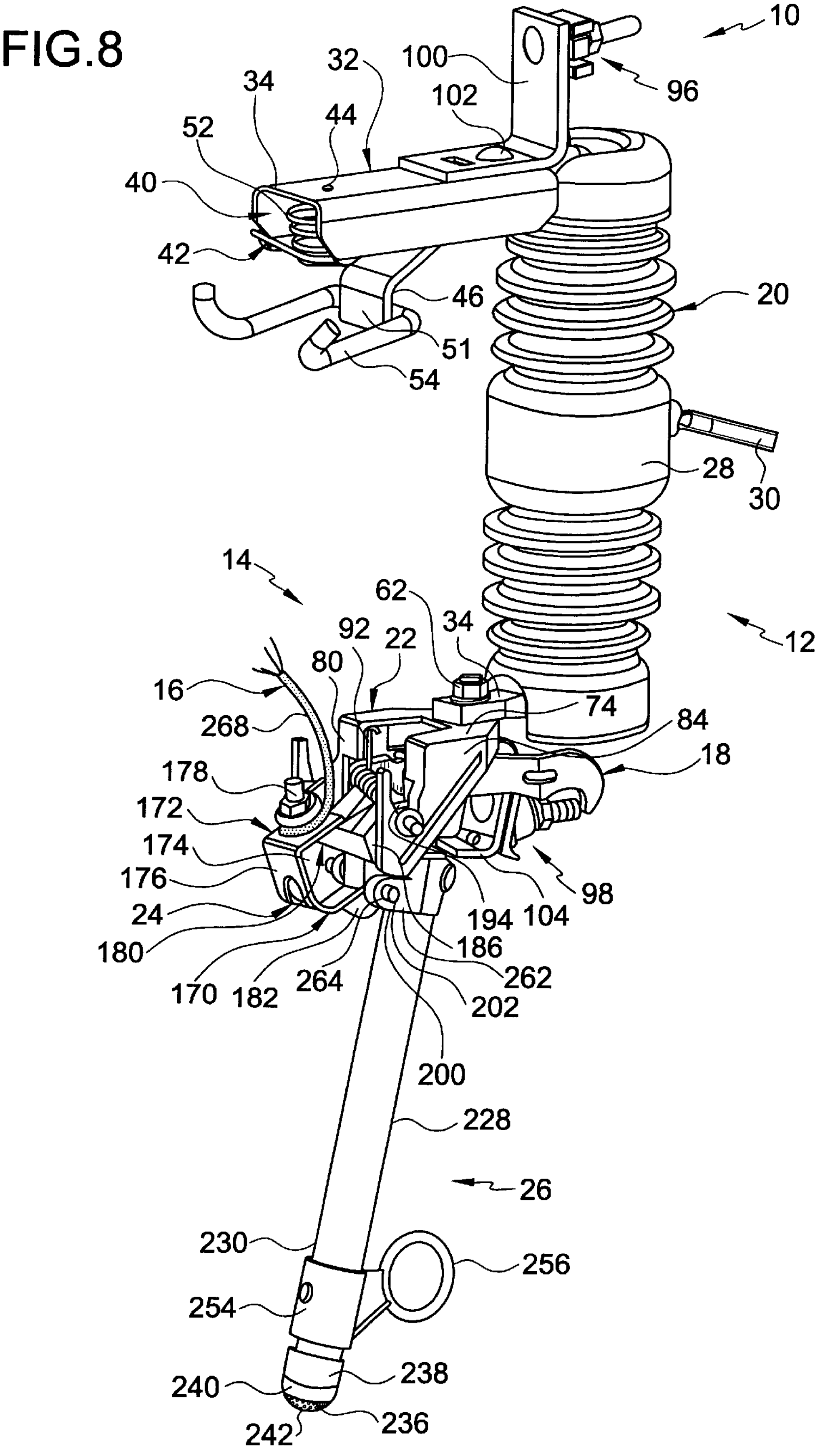
FIG. 8 is a front, right side, perspective view of the fuse cutout illustrated in FIG. 1, showing the fuseholder assembly in a drop-out position.

Referring to FIGS. 1–8, a fuse cutout 10 according to the present invention comprises a mounting assembly 12 and a fuseholder assembly 14 supported by mounting assembly 12. Fuse cutout 10 generally operates as a protective device for power distribution systems. Under normal conditions, fuseholder assembly 14 of fuse cutout 10 is in a closed position, as seen in FIG. 1, allowing current to pass through the system. However, upon occurrence of an overload, fuse cutout 10 acts to interrupt the current flow. In particular, a fuse element or link 16 in fuseholder assembly 14 melts allowing fuseholder assembly 14 to drop to an open position, as seen in FIG. 7, and then subsequently to drop to a full "drop-out" position, as best seen in FIG. 8.

Fused cutout 10 is mounted to a system support, such as a pole (not shown), via mounting assembly 12, and is typically located within a conductor. Mounting assembly 12 basically comprises a mounting 20 and a hinge or holder member 22. Fuseholder assembly 14 generally comprises a trunnion or pivot member 24, which is received in hinge member 22 once assembly 12 is mounted, and a fuseholder 26 for enclosing link 16 that is pivotally attached to trunnion 24. A lever member 18 is also included with fuseholder assembly 14 providing a mechanism for both ejecting link 16 once drop-out has occurred, thereby avoiding damage to cutout 10, and as a break lever allowing a lineman to manually break link 16 when desired. Lever member 18 is described in detail in commonly assigned and concurrently filed U.S. patent application Ser. No. 09/617,095 of Richard W. Smith et al. for a Fuse Cutout With Integrated Link Break Lever And Fuse Link Ejector.

Mounting 20 includes a generally cylindrical one-piece porcelain insulator or insulating member 28 with a mounting member 30 extending rearwardly therefrom for attachment to the system pole. Upper and lower support members 32 and 34 extend from opposing ends of insulator 28 in a frontward direction. Upper support member 32 extends from an extension member 33 and includes top and bottom surfaces 36 and 38, wherein top surface 36 is substantially planar and bottom surface 38 forms a channel 40 having a cross-section that is generally an upside down U-shape. Upper support member 32 is preferably made of galvanized or stainless steel.

A top or upper contact 42 is attached to upper support member 32 by a rivet 44 and extends downwardly from bottom surface 38 so that top contact 42 is disposed in channel 40. A biasing member 52 disposed in channel 40 between bottom surface 38 and contact 42, biases contact 42 downwardly to end of rivet 44 maintain contact pressure on fuseholder 26. Preferably, biasing member 52, is a stainless steel compression spring. Top contact 42 will be described in greater detail below.

Upper support member 32 also includes two steel hooks 54 connected at one end and attached to extension member 33 by a bracket 46, wherein one end 58 of bracket 46 is attached to upper support member 32 and the opposing second end 50 is attached to hooks 54. Bracket 46 further includes a planar stop surface 51 located proximate second end 50. Hooks 54 are spaced from one another such that fuseholder 26 can be easily received therebetween. Hooks 54 are for connection to a load break tool (not shown), and serve as a guide for fuseholder 26 upon its closing.

Lower support member 34 has planar top and bottom surfaces 56 and 58 and a central hole located near the end 60 of lower support member 34 for receiving a fastener 62, such as a bolt. Holder or hinge member 22 is attached to bottom surface 58 of lower support member 34 by fastener 62. Lower support member 34 is also preferably formed of galvanized or stainless steel.

Hinge member 22 comprises two symmetrical parts 64 joined at a rear end by wall 66 and open at a front end 68 forming a gap between parts 64 providing an inner receiving area for trunnion 24. Each part 64 includes a substantially flat top plate 74, a rear plate 76 extending downwardly from the rear edge 78 of top plate 74 and an opposing front plate 80 extending from the front edge 82 of top plate 74. Front plate 80 extends downwardly further than rear plate 76. An outward side plate 84 extends downwardly from the outer edge 86 of top plate 74 such that side plates 84 of each part 64 are facing outwardly and enclose inner receiving area 72. Each side plate 84 has a substantially trapezoidal shape to match the differing lengths of rear and front plates 76 and 80. Extending from front plate 80 of each part 64 is a hook-type member that forms a deep U-shaped slot 88 for receiving and providing a large pivot area for trunnion 24. Slots 88 further allow trunnion 24 to be easily inserted and removed from hinge member 22. Preferably, hinge member 22 and parts 64 are made of a highly conductive material, such as copper. In addition, hinge member 22 can be plated with a corrosive resistant material.

Each top plate 74 further includes a lower contact 92 fixedly attached thereto, as best seen in FIG. 1. Each lower contact 92 includes a contact portion proximate second end portion 96 that engages trunnion 24 creating a current path. Backup springs 94 are located behind each lower contact 92 applying pressure thereto. Preferably, each lower contact 92 is a unitary thin plate preferably formed of a highly conductive material, such as copper, and can be plated to assure low resistance current transfer from trunnion 24. Lower contacts 92 and their relation to trunnion 24 are described in further detail in copending, commonly assigned U.S. patent application Ser. No. 09/560,816 of Gerald B. Roberts et al. filed on Apr. 28, 2000 and entitled Fuse Cutout With Mechanical Assist, the subject of which is hereby incorporated by reference.

Opposing upper and lower terminals 96 and 98 extend from mounting 20, as seen in FIGS. 1, 7, and 8. Preferably, both terminals 96 and 98 are tin-plated bronze terminals, as known in the art, with upper terminal 96 connected to upper support member 32 by an upper bracket 100 mated to upper support member 32 by a fastener 102. Similarly, lower terminal 98 is mated to lower support member 34 by a lower bracket 104 connected to lower support member 34 by fastener 62 with rear end wall 66 of hinge member 22 being disposed between bottom surface 58 of lower support member 34 and the top surface of lower bracket 104. A current path is created from upper terminal 96 through top contact 42, through fuse link 16, through Trunnion 24 through lower contact 92, and finally through lower terminal 98.

Top contact 42 is preferably formed of a highly conductive material ensuring a positive current path from the top contact 42 to the fuse link 16. In particular, top contact 42 is formed of substantially pure Copper by weight and does not include any alloys such as Iron or Magnesium. Preferably, contact 42 comprises 99.90% Copper and 0.50% Oxygen by weight, such as OLIN ETP Copper No. 110 that has a conductivity of 101% at 65 degrees Fahrenheit and a tensile strength of about 43,000–52,000 PSI. Since the conductivity of contact 42 is so high, it can be made substantially thin, less than 1/16 of an inch, rather than thick, thereby significantly reducing costs in manufacturing both the contact and the cutout.

The structure of top contact 42 includes a first or upper surface 106 and a second or lower surface 108 opposing upper surface 106. Top contact 42 further includes a substantially planar first end portion 110 attached to upper support member 32 by fastener 102. In particular, fastener 102 extends through member 32, then through a fastener hole 112 in first end portion 110 of contact 42, through extension member 33, and finally through stop bracket 46, such that contact 42 is disposed between bottom surface 38 of upper support member 32 and extension member 33.

Figure 2:
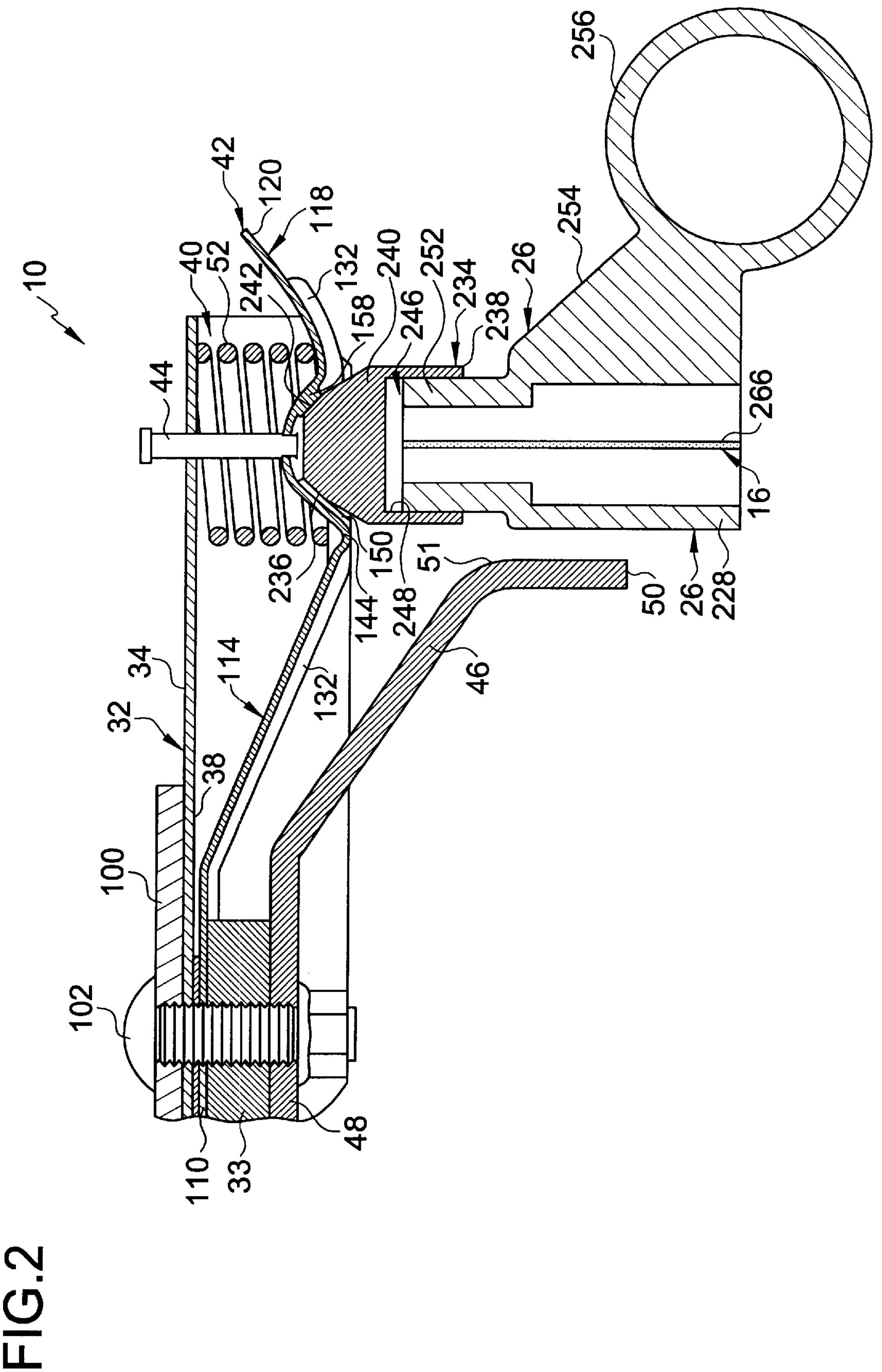
FIG. 2 is a side elevational view in section of the fuse cutout illustrated in FIG. 1, showing the engagement of a top contact and a fuseholder cap of the cutout.
Figure 3:
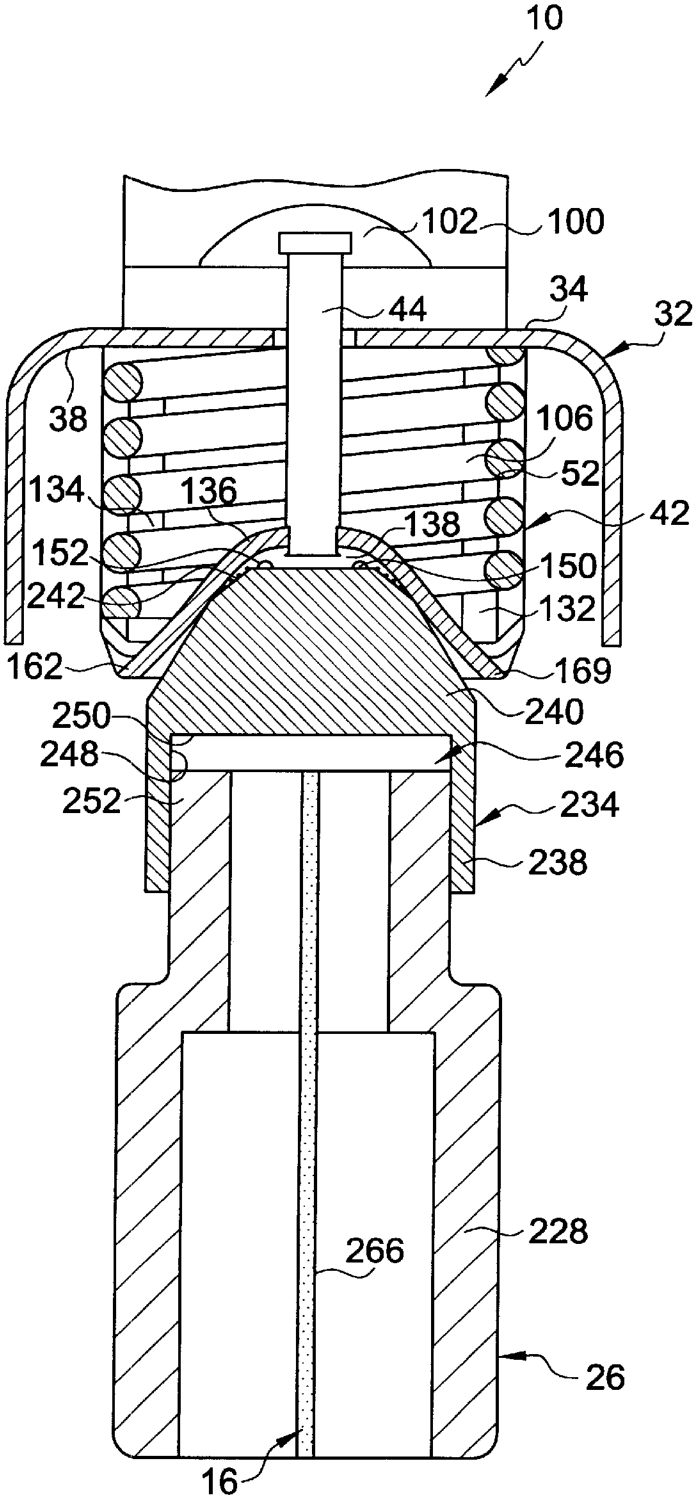
FIG. 3 is a front elevational view in section of the fuse cutout illustrated in FIG. 1, showing the engagement of the top contact and the fuseholder cap of the cutout.

Extending from first end portion 110 of contact 42 is an elongated middle portion 114 that is also substantially planar. In particular, middle portion 114 extends downwardly away from bottom surface 38 of member 32 thereby forming an obtuse angle between first end portion 110 and middle portion 114, as best seen in FIG. 2. Extending from middle portion 114 remote from first end portion 110 is a dome portion 116 for engaging fuseholder 26. Top contact 42 also has a second end portion 118 opposing first end portion 110 with a length of contact 42 being defined between first and second end portions 110 and 118. Second end portion 118 is substantially planar and extends upwardly from dome portion 116 toward bottom surface 38 of upper support member 32 forming a generally obtuse angle with dome portion 116. A bottom surface 120 of second end portion 118 serves a guide member when closing fuseholder 26 into dome portion 116 of contact 42.

Figure 4:
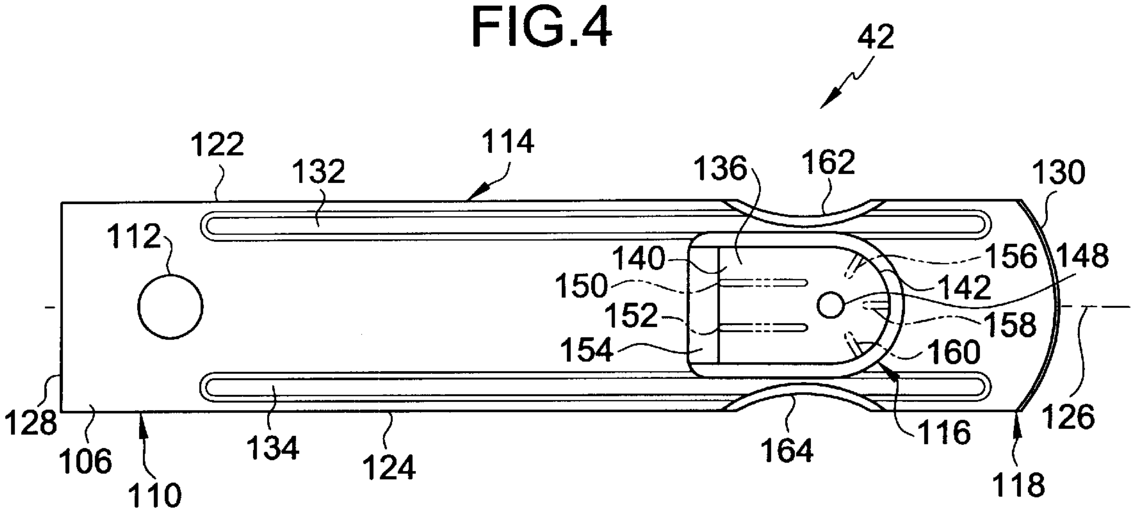
FIG. 4 is a top plan view of the top contact of the fuse cutout illustrated in FIG. 1.

First and second peripheral edges 122 and 124 extend along the sides of contact 42 and are substantially parallel to one another and to a longitudinal axis 126 of contact 42. A first straight end edge 128 extends between first and second edges 122 and 124 at first end portion 110 forming a generally ninety degree angle with edge, respectively, and a second curved end edge 130 extends between first and second edges 122 and 124 at second end portion 118, as best seen in FIGS. 4 and 6, such that contact 42 has a substantially rectangular shape.

To provide strength and reinforcement to contact 42, first and second strengthening ribs 132 and 134 are disposed thereon. Preferably, ribs 132 and 134 are formed by elongated depressions in upper surface 106 such that ribs 132 and 134 extend from lower surface 108 of contact 42 and are unitary therewith. In particular, ribs 132 and 134 extend generally the entire length of contact 42 adjacent peripheral edges 122 and 124, respectively, such that ribs 132 and 134 are substantially parallel thereto. Ribs 132 and 134, however, can be formed in any known manner, such as being formed separately from contact 42 and attached thereto. In addition, ribs 132 and 134 can be applied in any orientation with respect to contact 42 as long as they provide reinforcement to contact 42.

Dome portion 116 particularly includes a first or upper surface 136 that is substantially convex, an opposing second or lower surface 138 that is substantially concave, a first half section 140, and a second half section 142, with first section 140 being adjacent middle portion 114 and second section 142 being adjacent second end portion 118. As best seen in FIGS. 2 and 5, first section 140 defines a first slope 144 in cross section of dome portion 116 and second section 142 defines a second slope 146 wherein second slope 146 is substantially greater than first slope 144 (i.e., forms a greater angle with the horizontal). A rivet hole 148 is disposed at the apex of dome portion 116 where first and second sections 140 and 142 meet.

First section 140 particularly includes first and second ridges 150 and 152 disposed along lower surface 138 of dome portion 116. First and second ridges 150 and 152 are generally centrally disposed with respect to first section 140, are spaced from one another, and are parallel thereto such that first and second ridges 150 and 152 each extend in a plane substantially parallel to peripheral edges 122 and 124 of contact 42, as best seen in FIG. 6. Ridges 150 and 152 extend between a first end 154 of dome portion 116 to about rivet hole 148. First and second ridges 150 and 152 allow cap 234 on fuseholder 26 to slide decreasing stress on contact 42 that may otherwise cause damage thereto.

Second section 142 includes third, fourth, and fifth ridges 156, 158, and 160 disposed along lower surface 138. Each ridge 156, 158, and 160 extends radially around rivet hole 148 such that fourth ridge 158 extends in a plane parallel to first and second ridges 150 and 152 with third and fifth ridges 156 and 160 extending at a generally acute angel from fourth ridge 158, as best seen in FIG. 6. Third, fourth, and fifth ridges 156, 158, and 160 provides a positive current path from contact 42 to fuseholder 26.

Dome portion 116 further includes ear guides 162 and 164 projecting downwardly from edges 122 and 124, respectively, at either side of dome portion 116. Ear guides 162 and 164 provide a mechanism for guiding fuseholder 26 into proper position with respect to dome portion 116 when closing the fuseholder 26.

Referring to FIGS. 1, 7 and 8, trunnion 24 includes an upper section 170 and a lower section 172 that form a substantially D-shaped trunnion body with an open inner area 174 that can receive a disconnecting tool, for transporting fuseholder assembly 14. Upper section 170 has a substantially planar front plate 176 with a threaded stud 178 extending outwardly therefrom.

Lower section 172 generally includes a camming portion 180 and a pivot portion 182. Camming portion 180 has a generally elongated member with substantially curved inner and outer surfaces forming a substantially U-shaped cross-section. First and second cams 184 and 186 extend from the inner surface of camming portion 180 at opposing ends thereof. Each cam 184 and 186 is a substantially U-shaped plate. Each plate directly engages lower contacts 92 of hinge member 22 when fuseholder assembly 14 is mounted on mounting assembly 12, as best seen in FIG. 1.

Camming portion 180 further includes a sidewall 188 extending between cams 184 and 186 such that sidewall 188 and top wall 190 join at a substantially ninety degree angle. A receiving area is defined by cams 184 and 186, sidewall 188, and top wall 190 for accommodating a pivot pin 192. Specifically, each cam 184 and 186 includes a pin hole extension 194 through which a first pivot pin 192 extends providing a mechanism for pivotally coupling lever member 18 to trunnion 24 at a first pivot point 196.

Pivot portion 182 that extends from top wall 190 of camming portion 180. Specifically, pivot portion 182 includes a central pivot hole 198 for engaging a second pivot pin 200 coupling trunnion 24 and fuseholder 26.

As seen in FIGS. 1–3, 7, and 8, fuseholder 26 is pivotally coupled to pivot portion 182 of trunnion 24 at a second pivot point 202 and comprises an elongated fuse tube 228 having opposing upper and lower ends 230 and 232. Fuse tube 228 is preferably made of fiberglass and can be coated with an ultra-violet inhibitor. Upper end 230 includes a cap 234 assembled onto fuse tube 228 that is preferably formed of a highly conductive material, such as copper, and can be silver plated to provide efficient current transfer.

Cap 234 includes a top portion 236 for engaging dome portion 116 of top contact 42, an opposing bottom portion 238 for engaging fuse tube 228 and a middle portion 240 extending therebetween. Specifically, top portion 236 has an outer surface 242 that is roughened or knurled such that when cap 234 engages dome portion 116 a frictional engagement is created. Knurled includes small ridges or knobs, or a series of small ridges or knobs. A roughened surface includes a bumpy surface or anything that is coarse or shaggy to the touch. Outer surface 242 includes a central smooth surface 244 at a top end 236 of cap 234 such that only that portion of outer surface 242 that contacts dome portion 116 is knurled.

Bottom portion 238 of cap 234 is generally cylindrical, includes an inner area 246 defined by an inner sidewall 248 and an inner upper wall 250, and is shaped to receive the end 252 of fuse tube 228. Preferably, inner sidewall 248 is threaded to securely engage fuse tube 228. Middle portion 240 tapers from bottom portion 238 and top portion 236 tapers from middle portion 240 thereby forming a substantially frusto-conical shaped cap with both middle portion 240 and top portion 236 being solid portions.

Upper end 230 of fuse tube 228 further includes a top tube casting or bracket 254 having a pull ring 256 extending therefrom in a generally frontward direction for opening and closing fuseholder 26 with conventional disconnect tools.

Lower end 232 includes a bottom tube casting or bracket 258 having a base 260 and a pair of pivot extensions 262 extending therefrom in a direction toward trunnion 24 for engaging pivot portion 182 of trunnion 24. Each pivot extension 262 includes a pin hole 264 for receiving second pin 200. Pivot extensions 262 are spaced to allow pivot portion 182 of trunnion 24 to be inserted between extensions 262 such that pin hole 198 of pivot portion 182 aligns with pin holes 264 of pivot extensions 262. Pin 200 can then be inserted through pin holes 264 of fuseholder 26 and pin hole 182 of trunnion 24 connecting trunnion 24 and fuseholder 26. Base 260 further includes an engaging element or hook 270 for engagement with lever member 18 when fuseholder 26 is in the closed position.

Assembly

Referring to FIGS. 1–8, to assemble fuse cutout 10, mounting assembly 12 is first mounted to the system pole by mounting member 30 in any conventional manner. A conductor that is connected to a power source or power lines, can then be attached to upper terminal 96, in any known fashion. Lower terminal 98 can either be attached to another conductor or to a ground. Once mounting assembly 12 has been mounted, fuseholder assembly 14 can be assembled and engaged with mounting assembly 12.

Assembling fuseholder assembly 14 initially requires that trunnion 24 and fuseholder 26 be connected pivotally by pivot pin 200 being inserted through pivot holes 264 of fuseholder 26 and pivot hole 198 of trunnion 24, as described above. Once trunnion 24 and fuseholder 26 have been coupled, fuse link or element 16 can then be inserted into fuse tube 228 of fuseholder 26 connected to trunnion 24. Fuse link 16 is preferably any fuse link known in the art.

In particular, fuse link 16 is dropped into fuse tube 228 until the button head (not shown) on a first or upper portion 266 of fuse link 16 abuts upper end 230 of fuse tube 228. Cap 234 is then screwed onto upper end 230 such that the end 252 of fuse tube 228 is received in inner area 246 and inner upper wall 250 of the bottom portion 238 of cap 234 abuts the button head of fuse link 16, securing fuse link 16 in fuse tube 228. A second or lower portion 268 of fuse link 16, extends through lower end 232 of fuse tube 228, and is attached to trunnion 24.

Attaching fuse link 16 to trunnion 24 only requires first that lever member 18 be pivoted to a non-release position, as seen in FIG. 1, such that lever member 18 extends along the side and just below fuseholder 26. Lever member 18 applies pressure to link 16 biasing link 16 out of fuseholder 26. Then, the lower portion 268 of fuse link 16 is extended across lever member 18 and then wrapped around stud 178 of trunnion 24. A washer and a nut can then be applied and tightened onto stud 178 securing fuse link 16 thereto.

Once fuse link 16 is attached, trunnion 24 is secured in its first position, and lever member 18 is secured in its non-release position, such that trunnion 24 and fuseholder 26 form a substantially rigid body.

Once fuseholder assembly 14 is a substantially rigid body, it can then be mounted to mounting assembly 12. Specifically, by inserting disconnect tool through open inner area 174 of trunnion 24, fuseholder assembly 14 can be placed in mounting assembly 12 by inserting trunnion 24 in hinge member 22 of mounting assembly 12. Specifically, pin hole extension 194 of trunnion 24 engages slots 88 of hinge member 22, allowing trunnion 24 to rotate freely with respect to hinge member 22. In addition, lower contacts 92 of hinge member 22 engage camming portion 180 of trunnion 24 to create a current path when fuseholder is in closed position.

The weight of fuseholder assembly 14 will drop fuseholder 26 to its full drop-out position. Fuseholder 26 can then be closed by inserting the hot stick into pull ring 256 of fuseholder 26 and rotating fuseholder 26 to the closed position. Hooks 54 of mounting 20 act as guide when closing fuseholder 26 as well as bottom surface 120 of upper contact 42. The dome portion 116 in upper contact 42 catches top portion 236 of cap 234 of fuseholder 26 with biasing member 52 applying downward pressure on upper contact 42 holding fuseholder 26 in place. Specifically, lower dome surface 138 and first, second, third, fourth, and fifth ridges 150, 152, 156, 158, and 160 frictionally engage the knurled outer surface 242 of cap 234.

Since first slope 144 of first or back section 140 of dome portion 116 is a gentle slope and less steep than second slope 146 of front section 142, fuseholder 26 and cap 234 are allowed to travel slightly past the apex of dome portion 116 when being forced closed thereby reducing stress on the contact 42. In addition, first and second ridges 150 and 152 provide two contact points allowing cap 234 to slide with respect to contact 42 thus also reducing stress to contact 42 when closing. The reduction in stress in turn reduces the possibility of damage to the contact 42 due to a lineman closing the fuseholder 26.

Bracket 46 ensures, however, that fuseholder 26 does not over travel. Specifically, stop surface 51 of bracket 46 will abut cap 234 and casting 254 when the fuseholder 26 is being closed thereby preventing fuseholder 26 from traveling too far past dome portion 116 of contact 42. Once fuseholder 26 is properly engaged with contact 42, third, fourth, and fifth ridges 156, 158, and 160 provide a positive current path from contact 42 to cap 234 and fuse link 16.

Operation

Upon closing fuseholder 26, fuse cutout 10 is then operational as a protective device. As seen in FIG. 1, top portion 236 of cap 234 of fuseholder 26 engages upper contact 42, as described above, when fuseholder 26 is in the closed position. Trunnion 24 is concurrently in a first position, preferably such that first pivot point 196 is substantially lower than and nearly vertically aligned with second pivot point 202. In addition, each lower contact 92 of hinge member 22 engages cams 184 and 186 of camming portion 180 of trunnion 24 with back-up springs 94 applying pressure to lower contacts 92 and camming portion 180, as best seen in FIG. 1.

Under normal conditions, the current is allowed to travel through fuse cutout 10 when in its closed operative position. Specifically, the current will travel from a conductor to upper terminal 96 of mounting 20, through upper support member 32, through upper contact 42 to fuse element 16 via cap 234. The current then travels through fuse element 16 to stud 178 of trunnion 24, through camming portion 180 of trunnion 24 to the parallel current paths created by lower contacts 92, through hinge member 22, and finally through lower terminal 98.

Upon occurrence of an overload, fuse element 16 will melt separating first and second portions 266 and 268 such that trunnion 24 and fuseholder 26 are no longer a rigid body. In addition, upon separation of first and second portions 266 and 268, trunnion 24 is allowed to rotate with respect to hinge member 22 to a second position, lever member 18 is released dropping fuseholder assembly 14 initially to an open position, as seen in FIG. 7. The frictional engagement of knurling 236 of cap 234 of fuseholder 26 and dome portion 116 of contact 42, coupled with the biasing force of biasing member 52, ensures that fuseholder 26 will not drop out prior to the fuse link 16 melting, thereby avoiding catastrophic failure of cutout 10.

Once fuseholder assembly 14 has initially dropped to an open position, gravity will allow fuseholder assembly 14 to drop to the full drop-out position, as seen in FIG. 8. Trunnion 24 rotates to a third position in which, second pivot point 202 is below first pivot point 196. Fuseholder 26 simultaneously rotates to the drop-out position such that upper end 230 and cap 234 are pointing downwardly. In addition, lever member 18 forces lower portion 268 of fuse link 16 out of fuse tube 228 preventing damage to cutout 10. The fuseholder assembly 14 in the drop out position visually indicates that the over current has been interrupted and that it is safe to remove fuseholder assembly 14 from mounting assembly 12 and insert a new fuse element. Subsequently, fuseholder assembly 14 can be re-mounted to mounting assembly 12 and closed such that fuse cutout 10 is again operational.

While a particular embodiment has been chosen to illustrate the invention, it will be understood by those skilled in the art that various changes and modifications can be made therein without departing from the scope of the invention as defined in the appended claims.

What is claimed is:

1. A fuse cutout for connection to a power source, comprising:

a mounting having upper and lower support members extending from opposing ends of said mounting, respectively, said upper support member including a first contact extending therefrom, said first contact having opposing first and second end portions, a length defined between said first and second end portions, and a dome portion disposed between said first and second end portions, said first end portion being attached to said upper support member, said dome portion including opposing first and second dome surfaces and a first ridge extending along said second dome surface substantially parallel to a longitudinal axis extending along the length of said first contact;

a holder member fixedly attached to said lower support member of said mounting;

a pivot member received in said holder member at a first pivot point, said pivot member being movable between first and second positions; and a fuseholder movable between closed and open positions and having upper and lower ends, said lower end being pivotally coupled to said pivot member at a second pivot point, and said upper end having an engagement surface for engaging said first ridge of said dome portion of said first contact of said mounting forming an electrical connection therewith.

2. A fuse cutout according to claim 1, wherein said upper end of said fuseholder has a cap with opposing top and bottom portions and a middle portion extending therebetween, said top portion having a substantially knurled outer surface for frictional engagement with said second dome surface of said first contact.

3. A fuse cutout according to claim 1, wherein said second dome surface includes a second ridge.

4. A fuse cutout according to claim 3, wherein said second ridge is substantially parallel to the longitudinal axis extending along the length of said first contact.

5. A fuse cutout according to claim 4, wherein said dome portion includes first and second sections, said first section including said first and second ridges, said second section including a third ridge, said third ridge being substantially parallel to said longitudinal axis.

6. A fuse cutout according to claim 5, wherein said second section includes fourth and fifth ridges, each of said fourth and fifth ridges extending at an angle with respect to said longitudinal axis.

7. A fuse cutout according to claim 6, wherein said first dome surface is substantially convex; and said second dome surface is substantially concave.

8. A fuse cutout according to claim 7, wherein each of said first, second, third, fourth, and fifth ridges are located on said second surface.

9. A fuse cutout according to claim 8, wherein said first section of said dome portion has a first slope; and said second section of said dome portion has a second slope, said second slope being substantially greater than said first slope.

10. A fuse cutout according to claim 9, wherein said first contact is formed of a highly conductive material.

11. A fuse cutout according to claim 10, wherein a biasing member is disposed between said upper support member and said first contact surface of said first contact.

12. A fuse cutout according to claim 11, wherein a fuse element is disposed within said fuseholder, said fuseholder having first and second portions, said first portion being coupled with said fuseholder and said second portion being coupled with said pivot member.

13. A fuse cutout according to claim 12, wherein said holder member includes a second contact, said first and second contacts creating a current path through said fuse element.

14. A fuse cutout according to claim 13, wherein said first contact is a one-piece unitary member.

15. A fuse cutout for connection to a power source, comprising:

a mounting having upper and lower support members extending from opposing ends of said mounting, respectively, said upper support member including a first contact extending in a cantilever manner therefrom, said first contact being formed of substantially pure copper, said first contact having opposing first and second contact surfaces, opposing first and second end portions with said first end portion attached to said upper support member, and a first stiffening rib extending along either of said first and second contact surfaces and between said first and second end portions resisting bending of said first contact;

a holder member fixedly attached to said lower support member of said mounting;

a pivot member received in said holder member at a first pivot point, said pivot member being movable between first and second positions; and a fuseholder movable between closed and open positions and having upper and lower ends, said lower end being pivotally coupled to said pivot member at a second pivot point, and said upper end having an engagement surface for engaging said first contact of said mounting forming an electrical connection therewith.

16. A fuse cutout according to claim 15, wherein said first contact is formed of at least about 99.90 percent of pure copper by weight.

17. A fuse cutout according to claim 15, wherein said upper end of said fuseholder has a cap with opposing top and bottom portions and a middle portion extending therebetween, said top portion having a substantially knurled outer surface for frictional engagement with said first contact.

18. A fuse cutout according to claim 15, wherein said first contact includes a dome portion disposed between said first and second ends portions, said dome portion having opposing first and second dome surfaces, said first dome surface being substantially convex, and said second dome surface being substantially concave.

19. A fuse cutout according to claim 18, wherein said dome portion includes first and second sections, said first section having a first slope and said second section having a second slope, said second slope being substantially greater than said first slope.

20. A fuse cutout, comprising a mounting having upper and lower support members extending from opposing ends of said mounting, respectively, said upper support member including a first contact extending therefrom, said first contact being formed of substantially pure copper, said first contact having opposing first and second contact surfaces, opposing first and second end portions with said first end portion attached to said upper support member, and a first rib extending along either of said first and second contact surfaces;

a holder member fixedly attached to said lower support member of said mounting;

a pivot member received in said holder member at a first pivot point, said pivot member being movable between first and second positions;

a fuseholder movable between closed and open positions and having upper and lower ends, said lower end being pivotally coupled to said pivot member at a second pivot point, and said upper end having an engagement surface for engaging said first contact of said mounting forming an electrical connection therewith;

said first contact includes a dome portion disposed between said first and second ends portions, said dome portion having opposing first and second dome surfaces, said first dome surface being substantially convex, and said second dome surface being substantially concave;

said dome portion includes first and second sections, said first section having a first slope and said second section having a second slope, said second slope being substantially greater than said first slope; and said first contact includes a second rib extending along one of said first and second contact surfaces.

21. A fuse cutout according to claim 20, wherein said first and second ribs extending along said second contact surface of said first contact.

22. A fuse cutout according to claim 21, wherein said first contact includes opposing substantially parallel peripheral edges; and said first and second ribs are disposed adjacent and parallel to said peripheral edges, respectively.

23. A fuse cutout according to claim 22, wherein a biasing member is disposed between said upper support member and said first contact surface of said first contact; and a fuse element is disposed within said fuseholder, said fuseholder having first and second portions, said first portion being coupled with said fuseholder and said second portion being coupled with said pivot member.

24. A fuse cutout according to claim 23, wherein said holder member includes a second contact, said first and second contacts creating a current path through said fuse element.

25. A fuse cutout according to claim 24, wherein said first contact is a one-piece unitary member.

26. A fuse cutout, comprising:

a mounting having upper and lower support members extending from opposing ends of said mounting, respectively, said upper support member including a first contact extending therefrom, said first contact having opposing first and second contact surfaces, a first end portion attached to said upper support member, a second end portion opposite said first end, and a dome portion disposed between said first and second end portions;

a holder member fixedly attached to said lower support member of said mounting;

a pivot member received in said holder member at a first pivot point, said pivot member being movable between first and second positions; and a fuseholder movable between closed and open positions and including upper and lower ends, said lower end being pivotally coupled to said pivot member at a second pivot point, and said upper end having a cap with opposing top and bottom portions and a middle portion extending therebetween, said top portion having a substantially knurled outer surface;

said dome portion includes opposing first and second dome surfaces;

a first ridge extends along said second dome surface; and said knurled outer surface of said cap engages said first ridge when said fuseholder is in said closed position, whereby said first and second positions of said pivot member correspond to said closed and open positions of said fuseholder, respectively, and said knurled outer surface of said cap frictional engages said dome portion of said first contact when said fuseholder is in said closed position forming an electrical connection therewith.

27. A fuse cutout according to claim 26, wherein said dome portion includes a second ridge extending along said second dome surface.

28. A fuse cutout according to claim 27, wherein said first dome surface is substantially convex; and said second dome surface is substantially concave.

29. A fuse cutout according to claim 27, wherein said dome portion includes first and second sections;

said first and second ridges are located at said first section; and a third ridge extends along said second dome surface remote from said first and second ridges at a said second section.

30. A fuse cutout according to claim 27, wherein said first dome surface has a first slope; and said second dome surface has a second slope, said second slope being substantially greater than said first slope.

31. A fuse cutout according to claim 27, wherein said first contact has a longitudinal axis extending along a length of said first contact, first and second ribs extending substantially parallel to said longitudinal axis along said second contact surface.

32. A fuse cutout according to claim 27, wherein said knurled outer surface of said top portion of said cap extends around a smooth central surface of said top portion.

33. A fuse cutout according to claim 32, wherein a biasing member is disposed between said upper support member and said first contact surface of said first contact; and a fuse element is disposed within said fuseholder, said fuseholder having first and second portions, said first portion being coupled with said fuseholder and said second portion being coupled with said pivot member.

34. A fuse cutout according to claim 33, wherein said holder member includes a second contact, said first and second contacts creating a current path through said fuse element.

35. A fuse cutout according to claim 34, wherein when said first and second portions of said fuse element are connected, said pivot member is in said first position, and said fuseholder is in said closed position.

36. A fuse cutout according to claim 35, wherein when said first and second portions of said fuse element are disconnected, said pivot member is in said second position, and said fuseholder is in said open position.

* * * * *